Patented May 25, 1948

2,442,191

UNITED STATES PATENT OFFICE 2,442,191

SYNTHETIC ADSORBENT FOR SEPARATING HYDROCARBONS

James F. Black, Roselle, N. J., assignor to Standard Oil Development Company, a corporation of Delaware No Drawing. Original application May 26, 1944, Serial No. 537,529. Divided and this application June 23, 1945, Serial No. 601,329

15 Claims. (Cl. 252—270)

The present application is a division of my copending application, Serial No. 537,529, filed May 26, 1944.

It is desirable in many operations to remove normal paraffins from petroleum oil refinery gases since they would otherwise pass through a treating system as inert and reduce the capacity of a system to function in the desired manner to the extent of their presence in the original feed stock. For example, in the alkylation of isoparaffins with olefins, the isoparaffin, such as isobutane, is invariably associated with n-paraffins and of course the n-paraffins pass through the alkylation unit unchanged. To prevent the accumulation of this inert n-paraffin in the alkylation system, it is necessary to fractionate the unreacted isoparaffins which are recirculated to the reaction zone to remove the n-paraffins from the system and/or to maintain the quantity thereof below a certain maximum. I have discovered that n-paraffins may be separated from a mixture of normal and isoparaffins, naphthenes and aromatics by adsorption on a material hereinafter fully identified.

Another important aspect of my invention involves the removal of n-paraffins from a naphtha. Suppose that a naphtha contained paraffins as well as, say, naphthenes, isoparaffins and some aromatics, I may improve the octane number of that naphtha by causing the removal of a substantial quantity of n-paraffins by an adsorption method which will be explained more fully hereinafter.

The main object of my invention, therefore, is to provide an absorbent adapted to effect the separation of straight-chain hydrocarbons, such as n-paraffins, from other hydrocarbons in a more economical and expeditious manner than has heretofore been accomplished.

Other and further objects of the present invention will appear from the following description and claims.

I have found that a mixture of hydrous oxides of aluminum and silicon with a hydroxide or oxide of a group II metal of the periodic system, such as calcium oxide, is adapted to react together to form a substance exhibiting specific adsorption capacity for normal paraffins, if the said oxide and hydroxide mixture is heated, preferably with a solution of a salt of the group II element, to a temperature in the range of from 0° C. to 500° C., preferably from about 220° to about 400° C. The material produced after dehydration by heating in vacuo, is adapted for removing n-paraffins and/or n-olefins from mixtures of straight-chain hydrocarbons, isoparaffins, naphthenes and aromatics.

I shall set forth in the following specific examples several embodiments of my invention:

Example 1

Calcium hydroxide, alumina gel (precipitated from aluminum nitrate with ammonia and washed free of salts) and silica gel (Davison's washed silica gel) were mixed in the following mol proportions, based on the oxides, to wit; of $4CaO$, $Al_2O_3$, $4SiO_2$ and rotated three hours in a ball mill containing small stones. The product was dried at 250 F. and forced through a screen to form granules of a size of $\frac{1}{16}$ to $\frac{1}{4}$ inch in diameter. 200 cc. (approximately 20 grams) of this material and 2 liters of a 1% calcium acetate solution were sealed in a 1-gallon bomb and heated at 220° C. for 84 hours in a rocker to provide agitation. The pressure within the bomb was determined by the vapor pressure of the calcium acetate solution and the pressure of the 2 liters of air which were closed in when the bomb was sealed at room temperature. The absolute pressure resulting was about 360 lbs. per square inch. After the heating period the bomb was allowed to cool, opened, and the contents filtered to recover the solids. These were washed on the filter with distilled water and dried at 200° F. After being dehydrated under vacuum at 500° C., the product was found to be adapted to adsorb at 100 mm. pressure, the following amounts of gas expressed as cc. per gram of said product corrected to 0° C. and 1 atmosphere pressure:

|  | 176° F. | 230° F. | 270° F. | 424° F. | 491° F. |
|---|---|---|---|---|---|
| n-butane | 4.5 | 4.1 | 4.1 | 2.2 | 1.3 |
| iso-butane |  | 0.22 | 0.26 | 0 | 0 |

A check run was made using the same conditions of synthesis. The product had an adsorption capacity at 363° F. and 100 mm. pressure of 2.80 cc. normal butane per gram and 0.05 cc. isobutane per gram. This is a good agreement with the value of 2.90 cc. n-butane per gram which can be obtained for the adsorption of the former product at 363° F. and 424° F. The average capacity of the product prepared under these specific conditions is, therefore, 2.85 cc. n-butane (S. T. P.) per gram of solid adsorbent at 363° F. and 100 mm. of mercury pressure of n-butane.

Temperatures substantially higher than 220° C. are advantageous for the more rapid production of adsorption activity in the product. The effect of synthesis temperature is illustrated in the following examples:

Example 2

The synthesis was carried out under the conditions of Example 1, except that a reaction time of only 48 hours was allowed. This decreased the adsorption capacity for n-butane at 363° F. and 100 mm. pressure from 2.85 per gram for the substance from Example 1 to 0.44 cc. per gram for this material.

Example 3

The synthesis was carried out under the conditions of Example 2, except that a reaction temperature of 250° C. instead of 220° C. was employed. The adsorption capacity of the product at 363° F. and 100 mm. was increased six-fold to 2.74 cc. per gram by the 30° C. rise in synthesis temperature.

Example 4

The synthesis was carried out under the conditions of Example 1 but a slightly longer synthesis time of 96 hours instead of 84 hours was employed and the synthesis temperature was dropped to 160° C. In spite of the longer reaction time the product had an adsorption capacity at 363° F. and 100 mm. of only 0.45 cc. per gram compared to that of 2.85 cc. per gram for the product of Example 1.

Example 5

The synthesis was carried out under the conditions of Example 1, except that a synthesis temperature of only 100° C. was employed. There was hardly any detectable adsorption evidenced by the product.

The possibility to use salts of group II elements other than the acetate is shown by the following example:

Example 6

The synthesis was carried out under the conditions of Example 1, except that a 1% calcium chloride solution was used in place of the 1% calcium acetate solution. The adsorption capacity of the product was substantially the same, being 2.73 cc. per gram at 363° F. and 100 mm. compared to 2.85 cc. per gram for Example 1. In addition, the solution effected corrosion of the bomb giving an orange product containing 3.73% $Fe_2O_3$. This corrosive action is not evidenced when calcium acetate solution is employed.

The beneficial effect of increasing the concentration of the group II salt in solution in the liquid phase charged to the bomb is illustrated in the following example:

Example 7

The synthesis was carried out under the conditions of Example 1, except that the calcium acetate concentration in the liquid phase was 5%. The product showed an adsorption capacity of 3.15 cc. per gram at 363° F. and 100 mm. compared to 2.85 cc. per gram for the product of Example 1.

The beneficial effect of increasing the synthesis time is illustrated by comparing Examples 2 and 1, as well as by comparing the following Example 8 with Example 7:

Example 8

The synthesis was carried out under the conditions of Example 7, except that a heating time of 216 hours was employed. The product showed an adsorption capacity for n-butane at 363° F. and 100 mm. pressure of 4.85 cc. per gram compared to 3.15 cc. in Example 7.

The ability to use other forms of alumina and silica is shown by the following example:

Example 9

The synthesis was carried out under the conditions of Example 1 and with a starting charge of the same chemical composition, except that it was prepared by grinding calcium hydroxide alumina "tri-hydrate," (a commercial crystalline product having the formula $Al_2O_3.3HO$ of a very low soda content) and impalpable, air blown silica gel together in a mortar. The product adsorbed 0.63 cc. per gram at 363° F. and 100 mm. pressure of n-butane. The synthesis is possible, therefore, with these materials but is more readily effected when using the gel mixture procedure described above.

The adsorption on all the products from the various examples cited should be specific in character. This is indicated by the similarity of the X-ray patterns of the various products showing the same compound to have formed and by check runs on the isobutane adsorption of some of them. These were run at 363° F. and 100 mm. pressure of isobutane and showed:

| | Cc. per gram |
|---|---|
| Example 3 | 0.08 |
| Example 6 | 0.15 |
| Example 9 | 0.35 |

The solid substance prepared by the methods I have indicated is a white powder which is packed into agglomerates of moderate strength by drying from the form of a moist cake. The liquid phase filtered from the bomb at the end of a synthesis run contains no metallic elements other than the group II metal due to the soluble salt employed and solubility of the group II hydroxide in the solid charge. The overall chemical composition of the solid, therefore, is the same as that of the starting charge.

The crystal structure of the product as indicated by its X-ray diffraction pattern does not agree with that of any of more than 1000 natural minerals and synthetic chemicals available for comparison.

The experimental results from the examples cited indicate that the most favorable synthesis conditions are to employ high concentrations of a group II salt in the liquid phase charged to the bomb. The temperatures used for synthesis should be substantially higher than 220° C. and the heating time should be of the order of one week. High synthesis temperature would enable the employment of shorter heating times.

While subatmospheric pressures give good results during adsorption of n-paraffins, or n-olefins, atmospheric or superatmospheric pressures may be employed during the adsorption of said n-paraffins and n-olefins from a hydrocarbon gas mixture containing said n-paraffins.

Numerous modifications of my invention will be apparent to those who are familiar with this art.

What I claim is:

1. A new composition of matter adapted to adsorb straight chain hydrocarbons consisting essentially of a solid adsorptive material having the empirical formula based on the oxides

and which is prepared by reacting a hydrous oxide of aluminum, a hydrous oxide of silicon and calcium hydroxide for a period of from 48 to 216 hours at a temperature between 100° and 500° C., cooling to room temperature and dehydrating.

2. A new composition of matter adapted to adsorb straight chain hydrocarbons consisting essentially of a solid adsorptive material having the empirical formula based on the oxides $$4CaO.Al_2O_3.4SiO_2$$

and which is prepared by reacting a hydrous oxide of aluminum, a hydrous oxide of silicon and calcium hydroxide for a period of from 48 to 216 hours at a temperature between 220° and 400° C., cooling to room temperature and dehydrating.

3. A new composition of matter adapted to adsorb straight chain hydrocarbons consisting essentially of a solid adsorptive material having the empirical formula based on the oxides $$4CaO.Al_2O_3.4SiO_2$$

and which is prepared by reacting a hydrous oxide of aluminum, a hydrous oxide of silicon, calcium hydroxide and an aqueous solution in about 1 to 10% concentration of a calcium salt for a period of from 48 to 216 hours at a temperature between 100° and 500° C., cooling to room temperature and dehydrating.

4. A new composition of matter adapted to adsorb straight chain hydrocarbons consisting essentially of an adsorptive material having the empirical formula based on the oxides $$4CaO.Al_2O_3.4SiO_2$$

and which is prepared by reacting a hydrous oxide of aluminum, a hydrous oxide of silicon, calcium hydroxide and an aqueous solution in 5% concentration of calcium acetate for a period of from 48 to 216 hours at a temperature between 100° and 500° C., cooling to room temperature and dehydrating.

5. A new composition of matter adapted to adsorb straight chain hydrocarbons consisting essentially of an adsorptive material having the empirical formula based on the oxides $$4CaO.Al_2O_3.4SiO_2$$

and which is prepared by reacting a hydrous oxide of aluminum, a hydrous oxide of silicon, calcium hydroxide and an aqueous solution in 5% concentration of calcium chloride for a period of from 48 to 216 hours at a temperature between 100° and 500° C., cooling to room temperature and dehydrating.

6. A new composition of matter adapted to adsorb straight chain hydrocarbons consisting essentially of an adsorptive material having the empirical formula based on the oxides $$4CaO.Al_2O_3.4SiO_2$$

and which is prepared by reacting a hydrous oxide of aluminum, a hydrous oxide of silicon, calcium hydroxide and an aqueous solution in 5% concentration of calcium acetate for a period of from 48 to 216 hours at a temperature between 220° and 400° C., cooling to room temperature and dehydrating.

7. A new composition of matter adapted to adsorb straight chain hydrocarbons consisting essentially of an adsorptive material having the empirical formula based on the oxides $$4CaO.Al_2O_3.4SiO_2$$

and which is prepared by reacting a hydrous oxide of aluminum, a hydrous oxide of silicon, calcium hydroxide and an aqueous solution in 5% concentration of calcium chloride for a period of from 48 to 216 hours at a temperature between 220° and 400° C., cooling to room temperature and dehydrating.

8. The method of preparing an adsorbent material having the empirical formula based on the oxides $4CaO.Al_2O_3.4SiO_2$ which comprises reacting together a calcium oxide, a hydrous oxide of aluminum and a hydrous oxide of silicon in the proportion of 4:1:4 for a period from 48 to 216 hours at a temperature between 100° and 500° C.

9. Process according to claim 8 in which the temperature is between 220° and 400° C.

10. Process in which the absorbent prepared according to claim 8 is additionally heated under vacuum at a temperature of 500° C.

11. The method of preparing an adsorptive material having the empirical formula based on the oxides $4CaO.Al_2O_3.4SiO_2$ which comprises reacting together calcium hydroxide, a hydrous oxide of aluminum, a hydrous oxide of silicon in the proportion of 4:1:4 and an aqueous solution in about 1 to 10% concentration of a calcium salt for a period of from 48 to 216 hours at a temperature between 100° to 500° C., cooling at room temperature and dehydrating.

12. Process according to claim 11 in which the calcium salt is calcium acetate in 5% concentration.

13. Process according to claim 12 in which the temperature is 220° to 400° C.

14. Process according to claim 11 in which the calcium salt is calcium chloride in 5% concentration.

15. Process according to claim 14 in which the temperature is between 220° and 400° C.

JAMES F. BLACK.

REFERENCES CITED

The following references are of record in the file of this patent:

UNITED STATES PATENTS

| Number | Name | Date |
|---|---|---|
| 1,603,314 | Caldwell | Oct. 19, 1926 |
| 1,617,476 | Christopher | Feb. 15, 1927 |
| 1,776,990 | Baylis | Sept. 30, 1930 |
| 2,076,545 | Caldwell | Apr. 13, 1937 |
| 2,163,526 | Caldwell | June 20, 1939 |
| 2,359,697 | Udy | Oct. 3, 1944 |
| 2,378,155 | Newsome et al. | June 12, 1945 |

OTHER REFERENCES

Mellor, Comprehensive Treatise on Inorganic and Theoretical Chemistry, Longmans, Green & Co., N. Y., 1925, vol. 6, pages 691 and 692.